United States Patent

Fixler

[15] 3,695,208

[45] Oct. 3, 1972

[54] FOOD STORAGE APPARATUS FOR USE IN WATER-BORNE VESSELS

[72] Inventor: Jon Scott Fixler, Philadelphia, Pa.

[73] Assignee: Industrial Patent Development Corp., Philadelphia, Pa.

[22] Filed: Nov. 16, 1970

[21] Appl. No.: 89,752

[52] U.S. Cl. ............... 114/211, 114/0.5 R, 62/268
[51] Int. Cl. ............................................. B63j 2/12
[58] Field of Search ............. 114/211, 0.5 R; 62/268

[56] References Cited

UNITED STATES PATENTS 2,138,369   11/1938   Briant ....................... 114/185

1,295,417   2/1919   Boerner ....................... 62/268

FOREIGN PATENTS OR APPLICATIONS 1,377,844   9/1964   France ....................... 62/268

*Primary Examiner*—Andrew H. Farrell
*Attorney*—Seidel, Gonda & Goldhammer

[57] ABSTRACT

An enclosed, thermally insulated air-tight chamber within the vessel, and vacuum creating apparatus, responsive to motion of the vessel, in fluid communication with the chamber.

2 Claims, 3 Drawing Figures

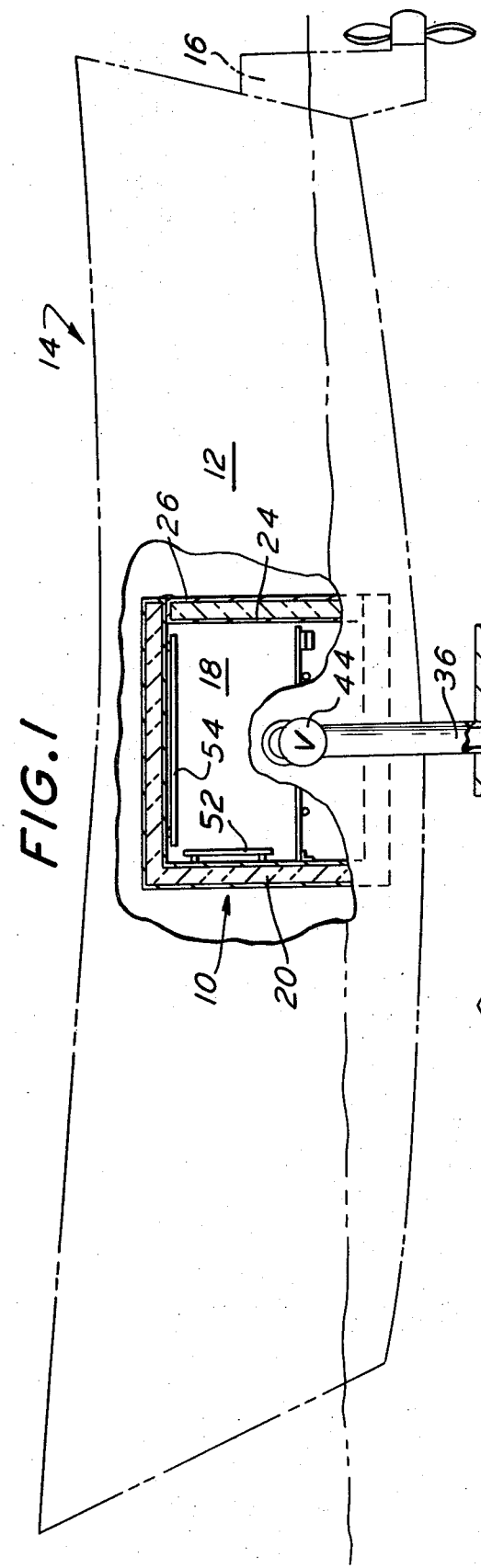
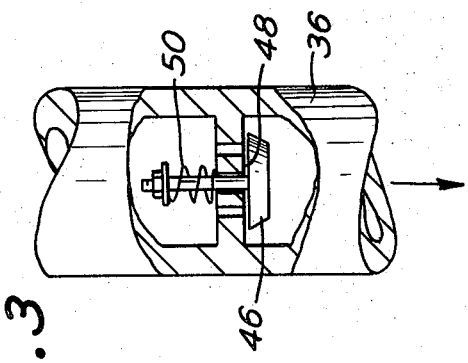
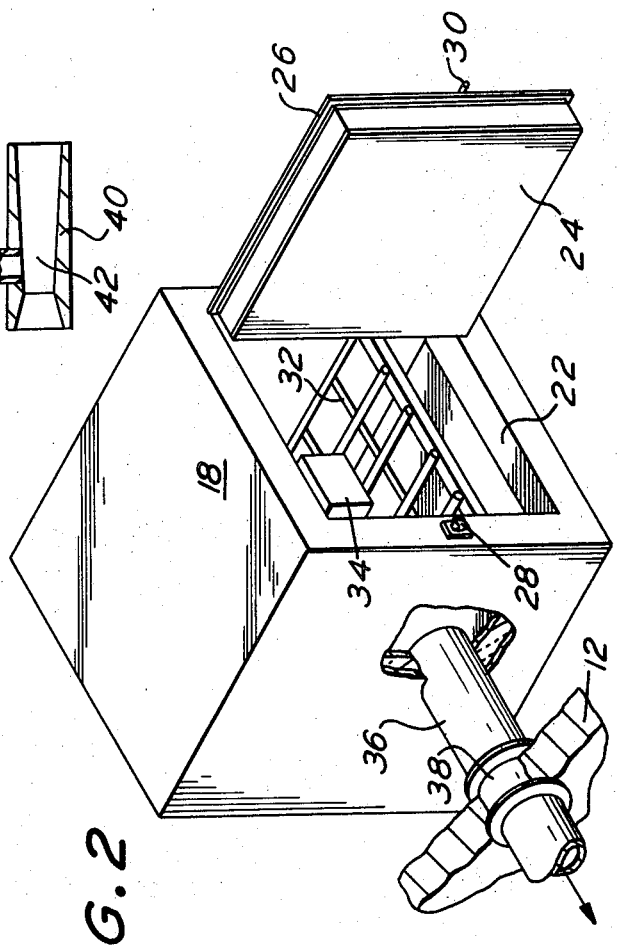
INVENTOR
JON S. FIXLER
BY
Seidel, Gonda & Goldhammer
ATTORNEYS

FOOD STORAGE APPARATUS FOR USE IN WATER-BORNE VESSELS

This invention relates to food storage apparatus for use in water-borne vessels, and more particularly, to food storage apparatus wherein the stored food is retained in a thermally insulated chamber at reduced ambient pressure.

Small water craft have heretofore been equipped with food storage apparatus of the sort used on dry land. Thus, where a vessel's power supply permits it, it is not unusual to provide a small electrical refrigeration unit of more or less conventional construction. In still smaller craft, where electrical units are impractical, cold chests using ice or dry ice as a cooling medium have been provided.

The shortcomings of the foregoing alternatives are immediately evident. The initial cost of electrical refrigeration units is relatively high. In small craft used solely for pleasure, the cost may be excessive. Moreover, many forms of small craft are used only for relatively short excursions. Such craft have little need for the refrigeration capabilities of electrical units. Units using ice raise the problem of waste water disposal. Where dry ice is used, availability of the cooling medium is a problem, and handling of the substance a nuisance.

The present apparatus is not intended to cool stored food products. Instead, it serves to maintain pre-cooled products in a cooled state over periods of time corresponding at least to the duration of the usual pleasure trip. It is a principal object of this invention to provide an apparatus wherein perishable material is maintained in a thermally insulated chamber, under reduced atmosphere.

It is another object of this invention to provide a simple food storage apparatus for use in water-borne vessels, which derives the energy for its operation from the motion of the vessel.

Other objects will appear hereinafter.

In its presently preferred form, the apparatus comprises an enclosed thermally insulated air-tight chamber within the hull of the vessel and accessible from within the vessel, the interior of the chamber being in fluid communication with a vacuum generating device outside the hull. One suitable vacuum generating device is a submerged jet pump or "ejector," positioned so that forward motion of the vessel drives water through its throat. The ejector draws air from within the chamber, and creates a partial vacuum therein.

For the purpose of illustrating the invention, there is shown in the drawings a form which is presently preferred; it being understood, however, that this invention is not limited to the precise arrangements and instrumentalities shown.

FIG. 1 is a side elevation view, partly broken away, showing the present food storage apparatus installed in a small craft.

FIG. 2 is a perspective view, partly broken away, showing portions of the food storage apparatus.

FIG. 3 is a detail view, showing a valve associated with the apparatus.

Referring now to the drawings in detail, wherein like numerals indicate like elements, there is seen in FIG. 1 a food storage apparatus designated generally by the reference numeral 10, installed in the hull 12 of a vessel 14. The vessel 14 is provided with conventional propulsion equipment, such as the illustrated out-drive unit 16.

The apparatus 10 includes an air-tight chamber 18. In the illustrated construction, the walls of the chamber 18 contain thermal insulating material 20. Those skilled in the art will appreciate that self-insulating materials such as foamed plastics would also be suitable for the chamber 18.

Referring to FIG. 2, the chamber 18 includes an access opening 22 and a hinged closure 24 associated therewith. Suitable gaskets 26 are provided around the periphery of the closure 24 to effect an air-tight seal between the closure 24 and the fixed portions of the chamber 18. Conventional latch apparatus 28, 30 may be provided for the closure 24.

A support 32 is provided within the chamber 18, and services to support articles, such as the illustrated article 34, in spaced relation to the walls of the chamber 18. The support 32 is an open-grid structure, designed so as not to impede air flow within the chamber 18, and to provide minimal thermal conductivity between the interior walls of the chamber 18 and the article 34.

A conduit 36, in fluid communication with the interior of the chamber 18 extends from the vessel into the water. In the illustrated form of the invention, the conduit 36 is carried through the hull 12 of the vessel 14 by a through-hull fitting 38.

A device for generating vacuum in the chamber 18 in response to forward motion of the vessel 14 is associated with the conduit 36. For example, referring to FIG. 1, an ejector 40 is associated with the conduit 36. As the vessel 14 moves through the water, the flow of water through the throat 42 of the ejector 40 creates suction in the conduit 36, and partly evacuates the chamber 18.

A valve 44 in the conduit 36 controls pressure drop in the chamber 18, and serves as a check against water flow through the conduit 36 into the chamber 18.

Referring to FIG. 3, one suitable valve 44 comprises a poppet type valve element 46, biased against its seat 48 by a spring 50. Reduced pressure in the lower portion of the conduit 36, created by the ejector 40, initially unseats the valve element 46, against the bias of the spring 50, and permits air flow in the direction of the arrow in FIG. 3. When pressure in the chamber 18 and upper portion of the conduit 36 approaches that in the lower portion of the conduit 36, the valve element 46 seats. The desired minimum pressure in the chamber 18 may be regulated by adjustment of the biasing spring 50.

It should now be apparent that the present apparatus 10 provides a heat-insulated environment in which articles, such as the article 34, can be stored. Transfer of heat through the walls of the chamber 18 is minimized by the insulation 20. Because vacuum is maintained in the chamber 18, heat transfer from its interior walls by convection is prevented. As has previously been explained, heat transfer from the interior walls of the chamber 18 by conduction is minimized by the support 32. Thus, pre-cooled articles placed in the apparatus 10 can be maintained at reduced temperatures for periods of up to several hours.

Referring again to FIG. 1, radiant heating elements 52, 54 may be provided within the chamber 18, if desired. The heating elements 52 and 54 make possible selective heating of the contents of the chamber 18. The heating elements 52 and 54 may be of the conventional type, suited to the power available in a given installation.

The present invention may be embodied in other specific forms without departing from the spirit or essential attributes thereof and, accordingly reference should be made to the appended claims, rather than to the foregoing specification as indicating the scope of the invention.

I claim:

1. Apparatus comprising a water-borne vessel, said vessel including a hull, an air-tight food storage chamber coupled to said vessel, said chamber comprising a plurality of thermally insulated walls that define an access opening and a thermally insulated door coupled to said chamber for selectively closing said access opening, article support means in said chamber for supporting articles thereon in spaced relation to the walls of said chamber, said article support means comprising an open grid so as not to impede air flow within said chamber and to minimize thermal conductivity between the interior walls of said chamber and the article, heating means disposed in said chamber for controlling the temperature of the interior of said chamber, means for reducing the pressure in said chamber to create a pressure differential between the interior and exterior of said chamber, said pressure reducing means being operative to increase said pressure differential in response to an increase in speed of said vessel, means for maintaining a pressure differential when the speed of said vessel is reduced, said pressure reducing means comprising an ejector and conduit means, said ejector having a passageway defining a throat through which water will pass, said conduit means having one end in fluid communication with the interior of said chamber and its other end coupled to said ejector adjacent said throat, said conduit means being of sufficient length so that said ejector is always below the surface of the water in which said vessel is to be disposed, said means for maintaining said pressure differential comprising a check valve member disposed in said conduit means intermediate said ejector and said chamber, means for biasing said check valve member to a normally closed position so that said pressure differential is maintained, said biasing means being responsive to the movement and speed of said vessel to selectively permit said check valve member to open as the speed of said vessel increases and to close said check valve member when the speed of said vessel is reduced.

2. Apparatus comprising a water-borne vessel, said vessel including a hull, a through-hull fitting which is disposed in said hull, an air-tight food storage chamber coupled to and disposed within said vessel, said chamber comprising a plurality of thermally insulated walls that define an access opening, a thermally insulated door coupled to said chamber for selectively closing said access opening, article support means in said chamber for supporting articles thereon, said article support means comprising an open grid, means for reducing the pressure in said chamber to create a pressure differential between the interior and exterior of said chamber, said pressure reducing means being operative to increase said pressure differential in response to an increase in speed of said vessel, means for maintaining a pressure differential when the speed of said vessel is reduced, said pressure reducing means comprising an ejector and conduit means, said ejector having a passageway defining a throat through which water will pass, said conduit means having one end in fluid communication with the interior of said chamber and its other end coupled to said ejector adjacent said throat, said conduit means extending through said through-hull fitting and being of sufficient length so that said ejector is always below the surface of the water in which said vessel is to be disposed, said means for maintaining said pressure differential comprising a check valve member disposed in said conduit means intermediate said ejector and said chamber, means for biasing said check valve member to a normally closed position so that said pressure differential is maintained, said baising means being responsive to the movement and speed of said vessel to selectively permit said check valve member to open as the speed of said vessel increases and to close said check valve member when the speed of said vessel is reduced.

* * * * *